United States Patent
Watkins

(10) Patent No.: US 7,148,723 B2
(45) Date of Patent: Dec. 12, 2006

(54) COMMON CONTROLLER AREA NETWORK INTERFACE

(75) Inventor: Roger Dwight Watkins, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 1217 days.

(21) Appl. No.: 10/058,806

(22) Filed: Jan. 30, 2002

(65) Prior Publication Data

US 2003/0145121 A1  Jul. 31, 2003

(51) Int. Cl.
H03K 19/0175 (2006.01)
G06F 13/00 (2006.01)
H04B 1/38 (2006.01)
H04L 5/16 (2006.01)

(52) U.S. Cl. .................. 326/62; 710/100; 375/219
(58) Field of Classification Search ................. 370/463
See application file for complete search history.

(56) References Cited

U.S. PATENT DOCUMENTS

| | | | |
|---|---|---|---|
| 4,429,384 A | 1/1984 | Kaplinsky | |
| 4,567,384 A | 1/1986 | Stuhlmiller | |
| 4,583,203 A | 4/1986 | Monk | |
| 4,620,310 A | 10/1986 | Lvovsky et al. | |
| 4,633,473 A | 12/1986 | Ratchford et al. | |
| 4,764,759 A | 8/1988 | Braun et al. | |
| 4,775,864 A | 10/1988 | Herman | |
| 4,782,300 A | 11/1988 | Bonaccio et al. | |
| 4,792,950 A | 12/1988 | Volk et al. | |
| 4,797,582 A | 1/1989 | Nguyen et al. | |
| 5,031,176 A | 7/1991 | Magne et al. | |
| 5,050,187 A | 9/1991 | Ichie | |
| 5,089,723 A | 2/1992 | Davis et al. | |
| 5,095,231 A | 3/1992 | Sartori et al. | |
| 5,268,597 A | 12/1993 | Fong | |
| 5,325,355 A | 6/1994 | Oprescu et al. | |
| 5,357,518 A | 10/1994 | Peter | |
| 5,448,180 A | 9/1995 | Kienzler et al. | |
| 5,570,042 A | 10/1996 | Ma | |
| 5,572,658 A | 11/1996 | Mohr et al. | |
| 5,574,848 A | 11/1996 | Thomson | |
| 5,585,743 A | 12/1996 | Kenji et al. | |
| 5,600,782 A | 2/1997 | Thomson | |
| 5,696,777 A | 12/1997 | Hofsaess | |
| 5,765,031 A | 6/1998 | Mimuth et al. | |
| 5,781,028 A | 7/1998 | Decuir | |
| 5,787,120 A | 7/1998 | Louagie et al. | |
| 5,963,053 A | 10/1999 | Manohar et al. | |
| 5,977,796 A | 11/1999 | Gabara | |
| 5,986,944 A * | 11/1999 | Merritt | ................. 365/189.05 |
| 6,032,209 A | 2/2000 | Mros et al. | |

(Continued)

Primary Examiner—Rexford Barnie
Assistant Examiner—Dylan White
(74) Attorney, Agent, or Firm—Finnegan,Henderson,Farabow,Garrett&Dunner

(57) ABSTRACT

An electronic interface is provided for connecting to various types of networks. The network places a data stream on a bus high signal and a bus low signal. The interface includes a ground synthesizer circuit, a capacitive isolator circuit, and an edge triggering circuit. The ground synthesizer circuit, coupled to the bus high signal and bus low signal, synthesizes a ground from the bus high signal and bus low signal. The capacitive isolator circuit, coupled to the ground synthesizer circuit, generates an isolated bus high signal from the bus high signal. The edge triggering circuit, coupled to the capacitive isolator circuit, regenerates the data stream into a first reconstructed data stream by comparing the isolated bus high signal with the ground. The resulting circuit comprises a digital data receiver that may be part of a transceiver.

24 Claims, 9 Drawing Sheets

U.S. PATENT DOCUMENTS 6,046,511 A      4/2000  Kincaid
6,115,831 A *    9/2000  Hanf et al. .................. 714/43

2004/0184517 A1 *  9/2004  Westfield et al. ........... 375/219

* cited by examiner

COMMON CONTROLLER AREA NETWORK INTERFACE

TECHNICAL FIELD

This invention relates to the field of computer interfaces, and more specifically, a system to interface an electronic device to a plurality of two-wire and four-wire network standards.

BACKGROUND

A number of years ago, the automotive industry was seeking a solution to the problem of the proliferation of wiring in automotive systems as the complexity of automotive controls was increasing. The number of electronic devices having the need to communicate with each other and with a central processor increased dramatically as antilock braking systems and traction controls become commonplace in vehicles. Often, several control devices needed access to the same process inputs, and accessing these inputs individually by the control devices was not practical. To simplify the communication of information among sensors, controllers, and displays, the automotive industry established the Controller Area Network (CAN) for communication of automotive data along a two wire, high speed data bus.

While CAN is a standard in widespread use, many other similar standards exist. A standard version of CAN is the CAN J-1939 standard designed for heavy trucks and off-highway vehicles. This standard sets forth a two-wire network topology. One of the wires is a CAN_H or CAN high wire and one of the wires is a CAN_L or CAN low wire. To reduce the effects of noise on the communications bus, a CAN network is a differential network that places a dominant bus condition on the network when CAN_H is at least 0.9 volts higher than CAN_L. A recessive bus condition is detected on the network when CAN_H is not higher than 0.5 volts above CAN_L. The nominal voltage on the line in the dominant state is 3.5 volts for CAN_H and 1.5 volts for CAN_L. The CAN network should also be galvanically isolated from the various sensors and controllers attached to the network.

Devicenet is a variation on the CAN network that provides for a four-wire communications bus. In addition to the standards described above for the CAN J-1939 standard, the Devicenet provides a Power and a Ground voltage on the additional two wires. A Devicenet must provide at least 500 volts of galvanic isolation in addition to electrical isolation.

ISO J-11783 is a variation of the CAN network that provides for a four-wire communications bus. In addition to the standards described for the J-1939 standard, the J-11783 standard provides reference voltage levels on the additional two wires. The J-11783 standard requires fault tolerance such that if one of the two data wires is opened or grounded, the network will continue to operate.

The J-1939, Devicenet, and ISO J-11783 standards are all passive networks. In other words, the differential voltage between the CAN_H and CAN_L signals will drift towards zero in the recessive state, but is not pulled to zero. In addition, the DC value of the high and low signal may drift anywhere between about one and four volts.

RS-485 is one type of differential network that utilizes an active network. The differential values on the high and low signals are pushed low or pulled high, but the current is limited to keep the voltage in the zero to five volt range. Modbus is one type of RS-485 network that offers galvanic isolation.

Another active differential network is the CAT datalink. In CAT datalink, resistors are used to tie the high/low line to either +5 volts or ground in order to effectuate a complete reversal of voltage when the bus is placed in a recessive state. In other words, instead of merely letting the high and low lines drift to a common voltage following the transition from a dominant to a recessive state, the CAT datalink actually reverses the differential voltage.

Because each of these differential networks has slightly different requirements, interfaces have generally been built specific to the type of differential network being utilized. For example, CAT datalink interfaces were designed specifically for CAT datalink buses, and J-1939 interfaces were designed for J-1939 buses. However, it is not cost efficient to build interfaces for devices that are specific to each individual network. An interface is needed that can communicate to a number of these devices without manual reconfiguration.

Peter Hanf describes a CAN interface with enhanced fault tolerance in U.S. Pat. No. 6,115,831, titled "Integrated Circuit for Coupling a Microcontrolled Control Apparatus to a Two-Wire Bus." Hanf discloses a circuit for interfacing to a CAN device that can communicate despite the presence of a bus fault, thus meeting the CAN standard and the J-11783 standard. Upon detection of a bus fault, the circuit generates a fault signal and alters the termination characteristics of the circuit to continue to operate in the presence of a fault. However, while fault tolerance is provided by the circuit, the circuit is not designed to interface with a great variety of bus designs.

SUMMARY OF THE INVENTION

Embodiments of the invention provide an electronic interface for connecting to a network. The network places a data stream on a bus high signal and a bus low signal. The interface includes a ground synthesizer, a capacitive isolator, and an edge triggering circuit. The ground synthesizer circuit synthesizes a ground from the bus high signal and bus low signal. The capacitive isolator circuit generates an isolated bus high signal from the bus high signal, and the edge triggering circuit regenerates the data stream into a first reconstructed data stream by comparing the isolated bus high signal with the ground.

BRIEF DESCRIPTION OF THE DRAWINGS

The accompanying drawings, which are incorporated in and constitute a part of this specification, illustrate exemplary embodiments of the invention and together with the description, serve to explain the principles of the invention.

DETAILED DESCRIPTION

Reference will now be made in detail to the exemplary embodiments which are illustrated in the accompanying drawings. Wherever possible, the same reference numbers will be used throughout the drawings to refer to the same or like parts and signals.

Figure 1:
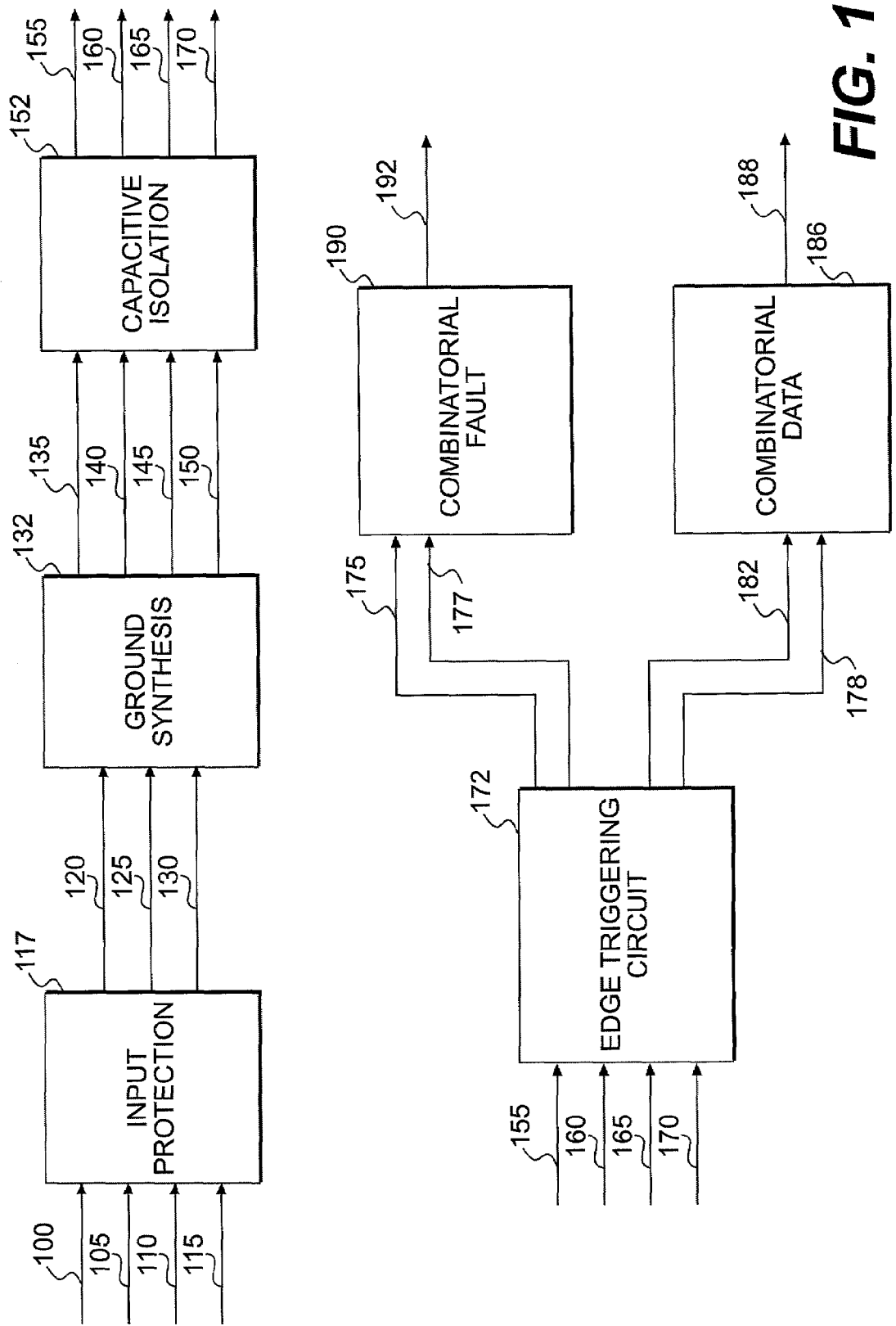
FIG. 1 illustrates a block diagram of a circuit for interfacing to two-wire and four-wire networks consistent with an exemplary embodiment of the present invention.

FIG. 1 illustrates a block diagram of a circuit for interfacing to two-wire and four-wire networks consistent with an exemplary embodiment of the present invention. A bus high or CAN high signal 100, power 105, ground 110, and a bus low or CAN low signal 115 may be present in a four-wire network bus. In two-wire implementations (e.g., CAT datalink, RS-485, or J-1939), power 105 and ground 110 may not be present. In four-wire implementations (e.g., J-11783 or Devicenet), power 105 and ground 110 may actually provide power and ground, respectively, or they may be reference voltage signals, depending on the standard implemented on the bus.

An optional input protection circuit 117 provides limitations on the amount that a J-11783 or Devicenet implementation will load the bus. The input protection circuit 117 may have current limiting features to prevent current spikes or electrostatic discharge from progressing through the circuitry of the interface. In addition, the input protection circuit 117 may limit the maximum voltage that will be seen by later portions of the circuitry and limits the maximum differential voltage. The input protection circuit 117 also may provide electrical isolation between digital input ground and the chassis ground of the device in which the circuit is located. The input protection circuit 117 provides outputs of protected CAN high 120, ground 125, and protected CAN low 130 to the ground synthesis circuit 132.

Ground synthesis circuit 132 generates a synthesized ground for two-wire applications that typically do not have the ground wire 110 that is found in most four wire bus implementations. Ground synthesis circuit 132 provides a synthesized ground by averaging the input of the differential signal on protected CAN high 120 and protected CAN low 130. The ground synthesis circuit 132 provides a protected CAN high 135, synthesized high ground 140, synthesized low ground 145, and protected CAN low 150 to capacitive isolation circuit 152.

Capacitive isolation circuit 152 serves to limit current passing through the circuit and eliminate DC aspects of the signals, such that only AC components of the signals pass through the circuit 152. In other words, only transitions, or edges, of the incoming high and low data signals are transmitted through the capacitive isolation circuit 152. The capacitive isolation circuit 152 provides an isolated CAN high 155, an isolated high ground 160, an isolated low ground 165, and an isolated CAN low 170 signal to the edge triggering circuit 172.

Edge triggering circuit 172 provides data high and data low signals to combinatorial and fault logic for processing. The edge triggering circuit incorporates schmitt triggering features to reduce noise sensitivity. The incoming CAN signals to the input protection circuit 117 may be noisy, experiencing various ESD and RF noise. Edge triggering circuit 172 contains circuitry to take the incoming AC edge signals and reconstruct DC logic level signals. The edge triggering circuit sends data high 182 and data low 178 signals to the combinatorial data circuit 186. In addition, the edge triggering circuit sends data low pump 175 and data high pump 177 to the combinatorial fault circuit 190.

Combinatorial data circuit 186 takes the two individual pulse trains, data high 182 and data low 178, and generates a single bit stream of data 188. During non-fault operation of the system, the bitstream will mirror the data high 182 input. The combinatorial data circuit 186 will continue to generate an accurate bitstream even upon the loss of one of the two input signals when a low ground and/or high ground signal is present.

Combinatorial fault circuit 190 takes input signals from the edge triggering circuit 172 and generates a fault signal 192 if one or both input data streams are absent.

Figure 2:
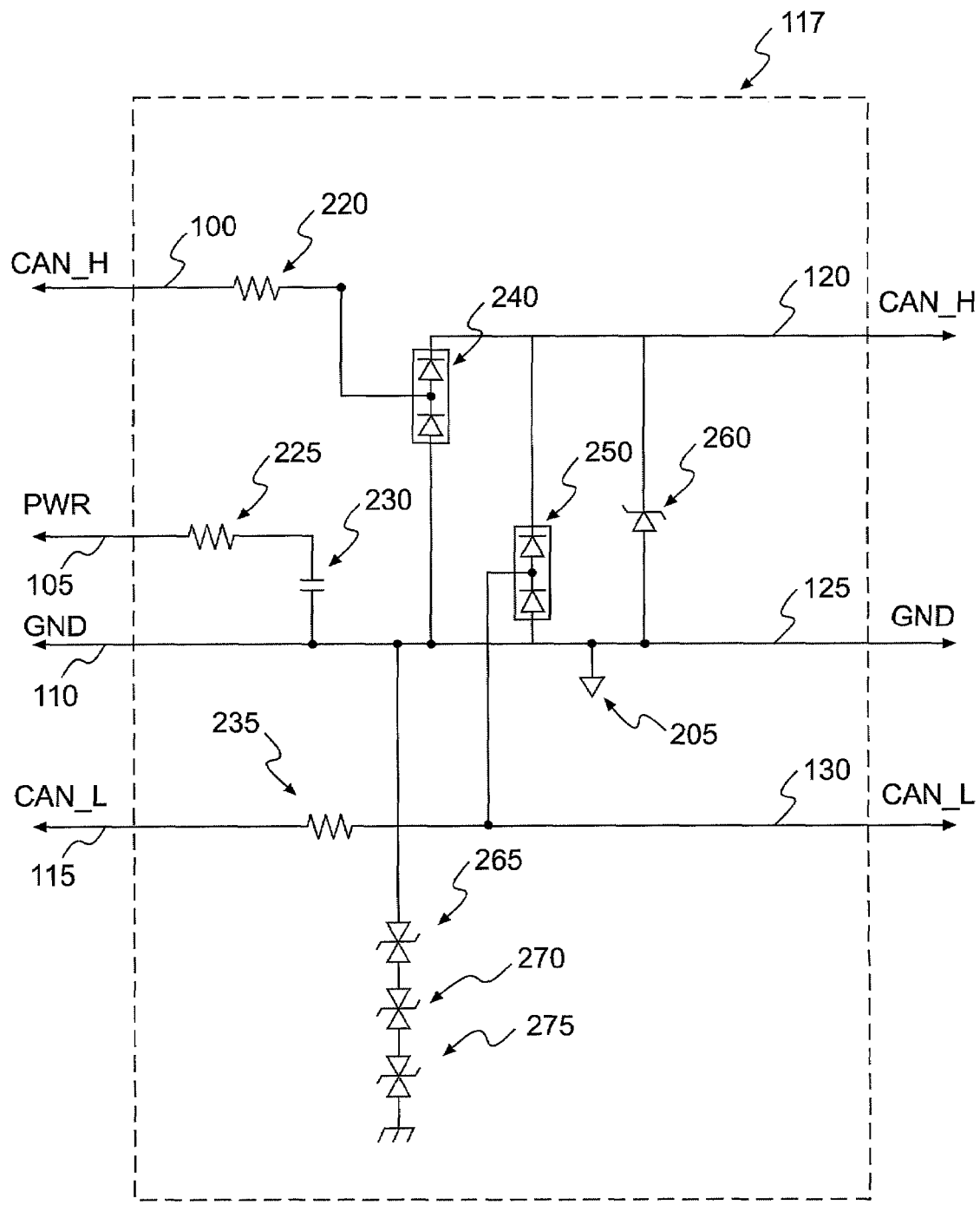
FIG. 2 illustrates a schematic drawing of an input protection circuit consistent with an exemplary embodiment of the present invention.

A detailed discussion of exemplary circuits will now be discussed. FIG. 2 illustrates a schematic drawing of an input protection circuit 117 consistent with an exemplary embodiment of the present invention. Resistors 220, 225 and 235 are current limiting resistors to provide protection to the remainder of the circuitry from incoming spikes. As discussed previously, these data buses are often operated in electrically noisy environments.

Resistor 225 and capacitor 230 are utilized to limit the loads on the power lines of a four-wire bus to remain within the specified load limit of the bus standards. Series diode pairs 240 and 250 take an incoming low signal and shunt an incoming low level signal to datalink ground (indicated by the darkened ground symbol 205); the diode pairs 240 and 250 also function to take a high level signal and shunt it to the high side of zener diode 260. In the exemplary embodiment of the invention, zener diode 260 is a 12 volt zener. Thus, the series diode pairs 240 and 250 drive a low incoming signal to ground and a high incoming signal to approximately 12 volts.

The zener diode 260, along with diode pairs 240 and 250, prevent the incoming differential signal on CAN high 100 and CAN low 115 from having a differential voltage of greater than the zener diode's value, e.g., in the exemplary embodiment 12 volts. Zener diodes 265, 270, and 275 provide operating margin between the datalink ground and chassis ground. Additional zener diodes may be used to provide operating margin between chassis ground and internal circuitry ground (shown in the drawings as a non-filled ground).

Figure 3:
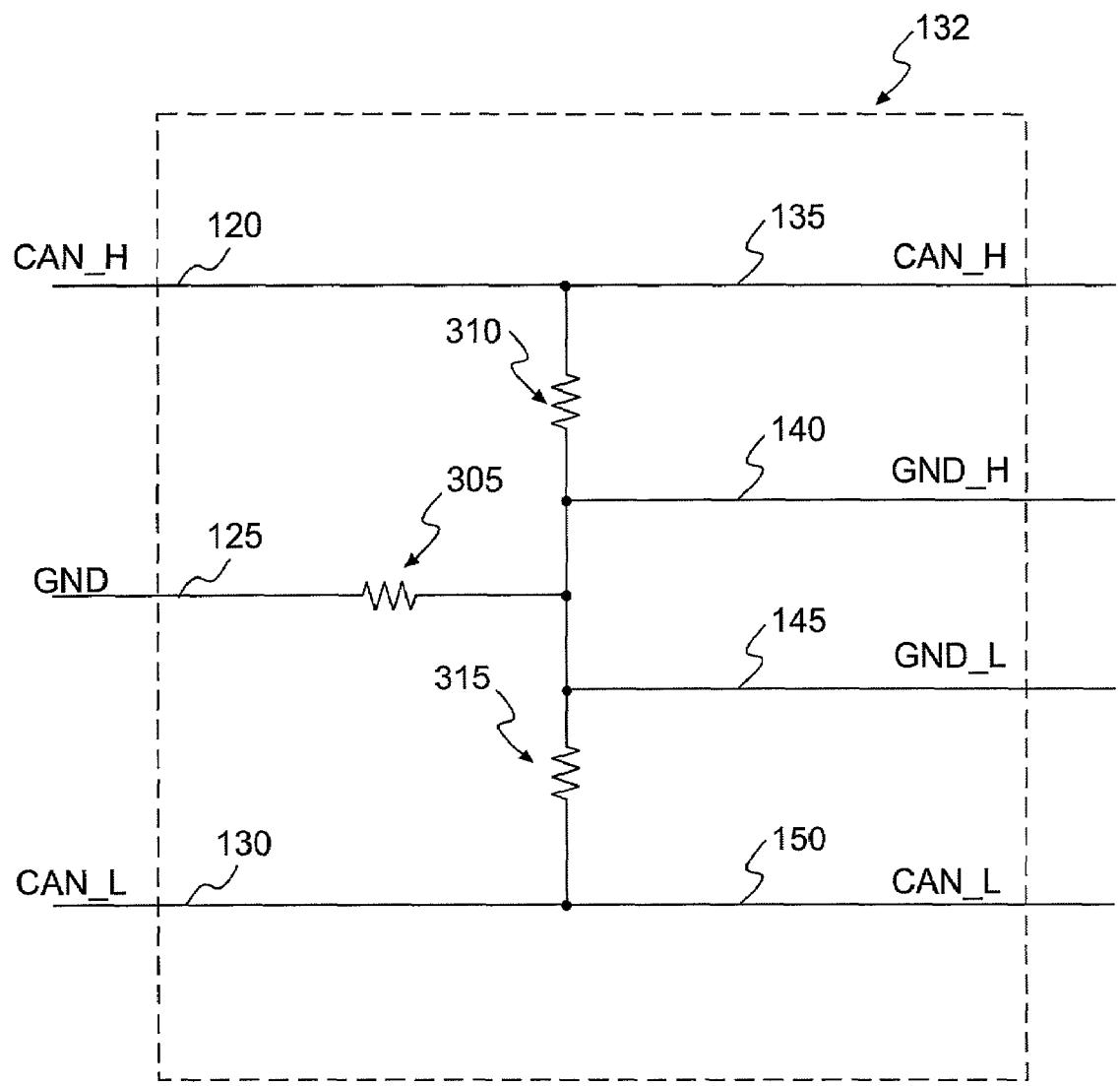
FIG. 3 illustrates a schematic drawing of a ground synthesis circuit consistent with an exemplary embodiment of the present invention.

FIG. 3 illustrates a schematic drawing of the ground synthesis circuit 132 consistent with an exemplary embodiment of the present invention. Resistor bridges 305, 310, and 315 are utilized to either use the incoming ground signal 125 or, if the incoming ground signal is not present, generate a synthesized ground. In an exemplary embodiment of the present invention, resistors 310 and 315 are equivalently sized such that they equally divide the voltage differential between protected CAN high 120 and protected CAN low 130 to generate the synthesized ground output as synthesized high ground 140 and synthesized low ground 145. Therefore, regardless of what is connected, a ground, at some appropriate DC or AC voltage level, will be generated.

Figure 4:
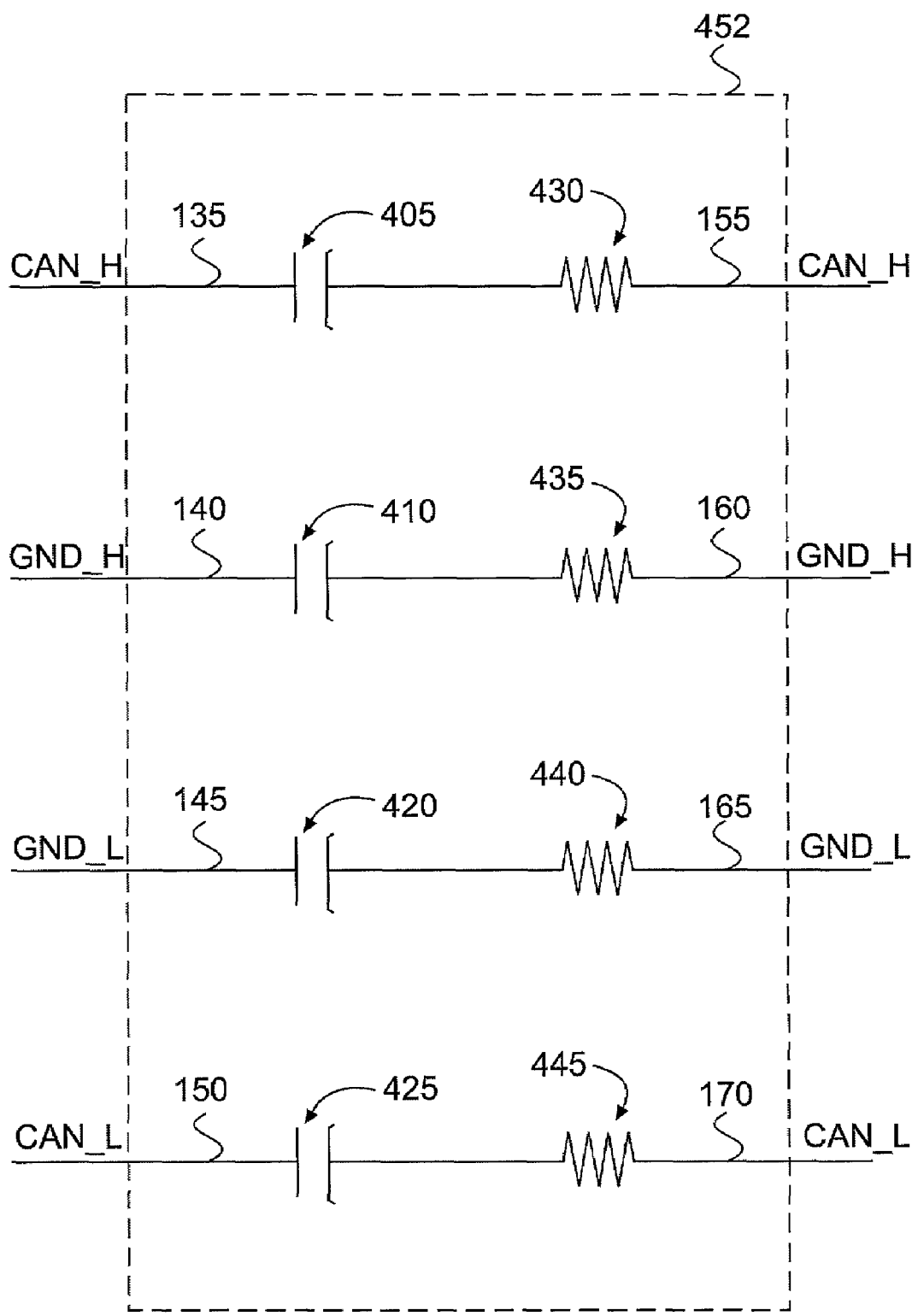
FIG. 4 illustrates a schematic drawing of a capacitive isolation circuit consistent with an exemplary embodiment of the present invention.

FIG. 4 illustrates a schematic drawing of the capacitive isolation circuit 152 consistent with an exemplary embodiment of the present invention. Capacitors 405, 410, 420, and 425 remove the DC component of the incoming signals, sending only edges of the signal through the capacitive isolation circuit 152. Resistors 430, 435, 440, and 445 are in place to further serve as current limiters.

Figure 5:
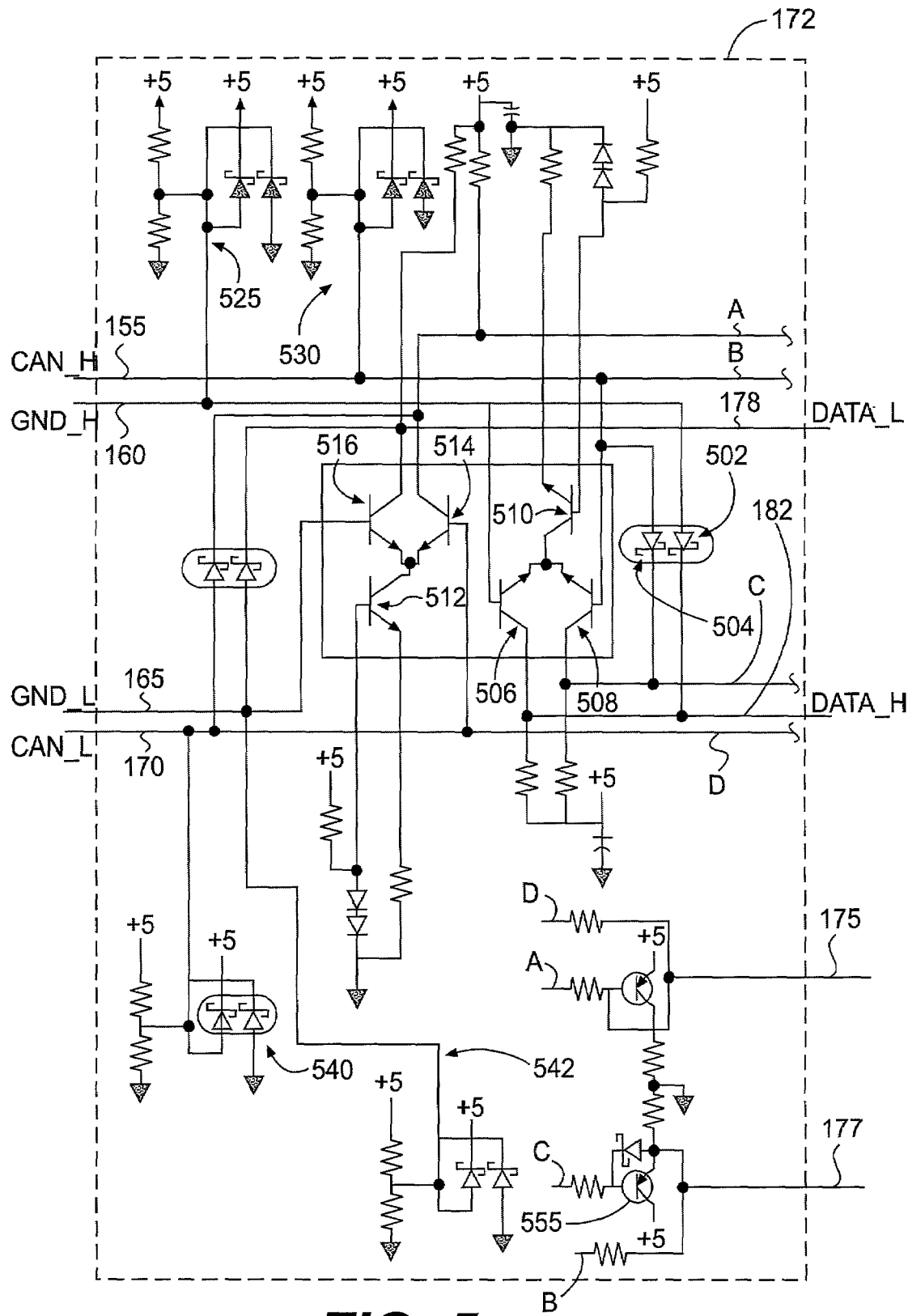
FIG. 5 illustrates a schematic drawing of an edge triggering circuit consistent with an exemplary embodiment of the present invention.

FIG. 5 illustrates a schematic drawing of the edge triggering circuit 172 consistent with an exemplary embodiment of the present invention. The edge triggering circuit 172 receives an isolated CAN high 155, an isolated high ground 160, an isolated low ground 165, and an isolated CAN low 170 signal from the capacitive isolation circuit 152. The isolated high ground 160 and isolated low ground 165 signals should be relatively steady signals, with the exception of any noise that appears from operation of the bus. The isolated CAN high 155 will provide a positive pulse on a high transition of CAN high 100 to a dominant state and will provide a negative pulse on a low transition of CAN high 100 to a recessive state. The isolated CAN low 170 will provide a negative pulse on a low transition of CAN low 115 to a dominant state and will provide a positive pulse on a high transition of CAN low 115 to a recessive state. Kicking circuits 525, 530, 540, and 542 provide a DC bias to provide the voltage bias for the pulses and bias the differential amplifier circuitry 509.

A data high differential amplifier 511 includes transistors 506, 508, and 510. On a positive spike from isolated CAN high 155, transistor 508 will turn on and transistor 506 will turn off. This will turn on transistor 555, which will supply power through schottky diode 504, giving schmitt trigger feedback to latch the data high differential amplifier 511 in an on state. On a negative spike from isolated CAN high 155, transistor 508 will turn off and transistor 506 will turn on. This will turn off transistor 555, which will provide schmitt trigger feedback through schottky diode 502 to hold the data high differential amplifier 511 in the off state. The use of schmitt triggers provides a fast turn off and turn on time, in addition to hysterisis useful in meeting various standards and rejecting signal noise. Thus, a reconstructed data stream is regenerated from the incoming pulse stream. This signal is output on data high 182 for use in the combinatorial data circuit 186. In addition, a data high pump signal 177 of discrete data is sent to the combinatorial fault circuit 190 for monitoring fault detection.

A data low differential amplifier 517 includes transistors 512, 514, and 516. The data low differential amplifier 517 functions analogously to the data high differential amplifier 511, except with reverse polarity. It outputs a clean data low 178 signal for use in combinatorial data circuit 186. In addition, a data low pump 175 signal is used in the combinatorial fault circuit 190 for monitoring fault detection.

Figure 6:
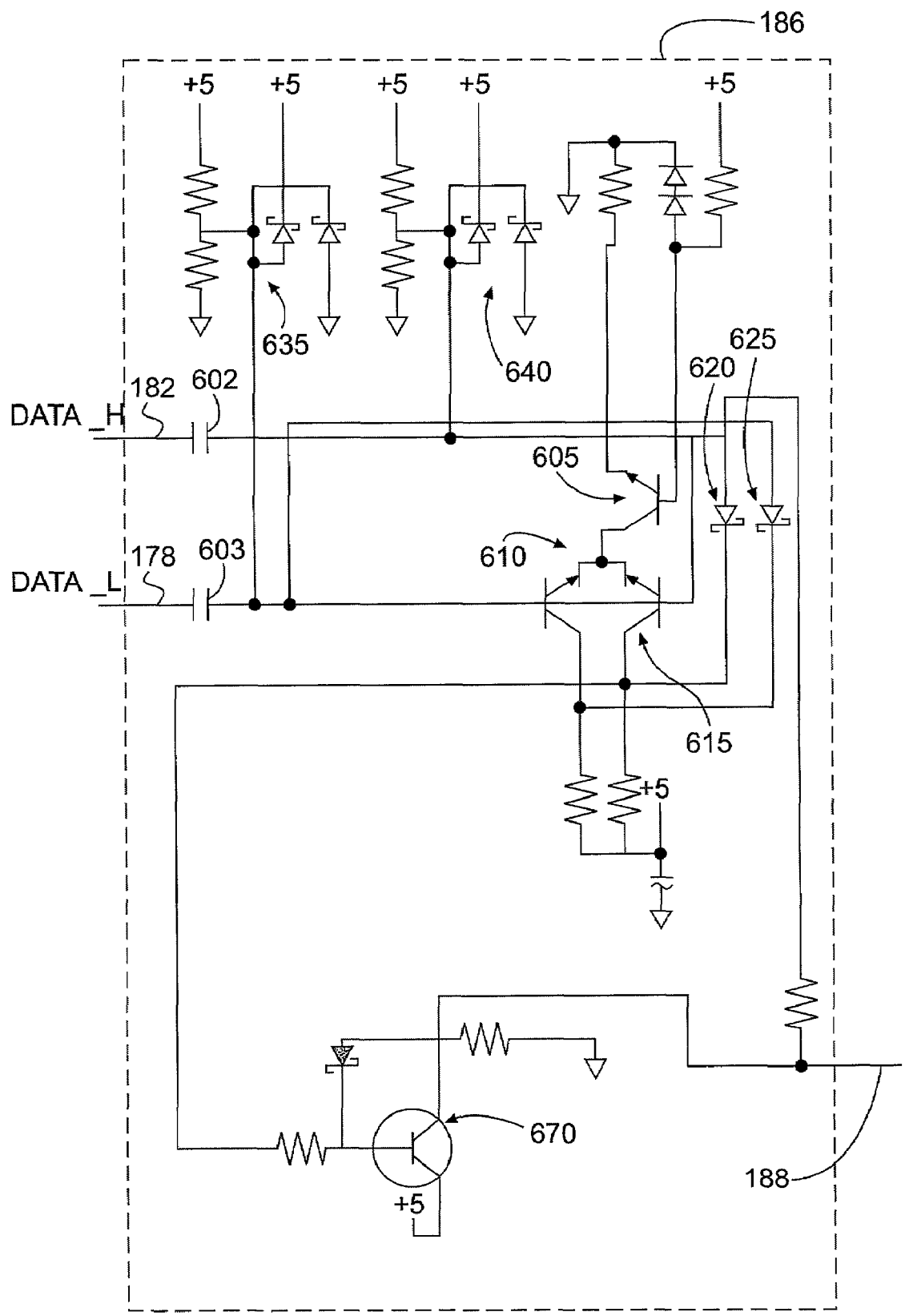
FIG. 6 illustrates a schematic diagram of a combinatorial data circuit consistent with an exemplary embodiment of the present invention.

FIG. 6 illustrates a schematic diagram of a combinatorial data circuit 186 consistent with an exemplary embodiment of the present invention. Capacitors 602 and 603 take the incoming data high 182 signal and data low 178 signal, respectively, and transform the digital square wave input signal into a series of pulses, similar to the operation of the capacitive isolation circuit 152. This provides a data high pulse train and a data low pulse train to the differential amplifier that includes transistors 605, 610 and 615. Kicking circuits 635 and 640 provide a DC bias to provide the voltage bias for the pulses and bias the differential amplifier circuitry. The differential amplifier operates in conjunction with the schottky diodes 620 and 625 and transistor 670 to turn the pulses back into a square wave.

Assuming both signal lines are operational, in other words there are transitions occurring on both data high 182 and data low 178, the differential amplifier should see a pair of opposite pulses on its inputs. When a dominant state is placed on the bus, the differential amplifier should see a positive pulse out of the capacitor on the data high 182 line and a negative pulse out of the capacitor on the data low 178 line. The differential amplifier will then latch in an ON state. When a recessive state is placed on the bus, the differential amplifier should see a negative pulse out of the capacitor on the data high 182 line and a positive pulse out of the capacitor on the data low 178 line. Thus the differential amplifier should latch in an OFF state.

If one of the pulse trains is missing, due to an open or shorted input line for instance, the differential amplifier will continue to operate. For instance, if no signal is present on the data low 178 input, on a transition to a dominant state the output of capacitor 602 will be a positive pulse. There will be no pulse out of the capacitor 603 from the data low 178 input. However, there will still be enough positive differential voltage present when comparing the pulse on the high side to the low voltage on the low side to switch the state of the differential amplifier. Thus, a bit stream will always be present on bitstream 188, so long as one of the two differential input lines is working.

Figure 7:
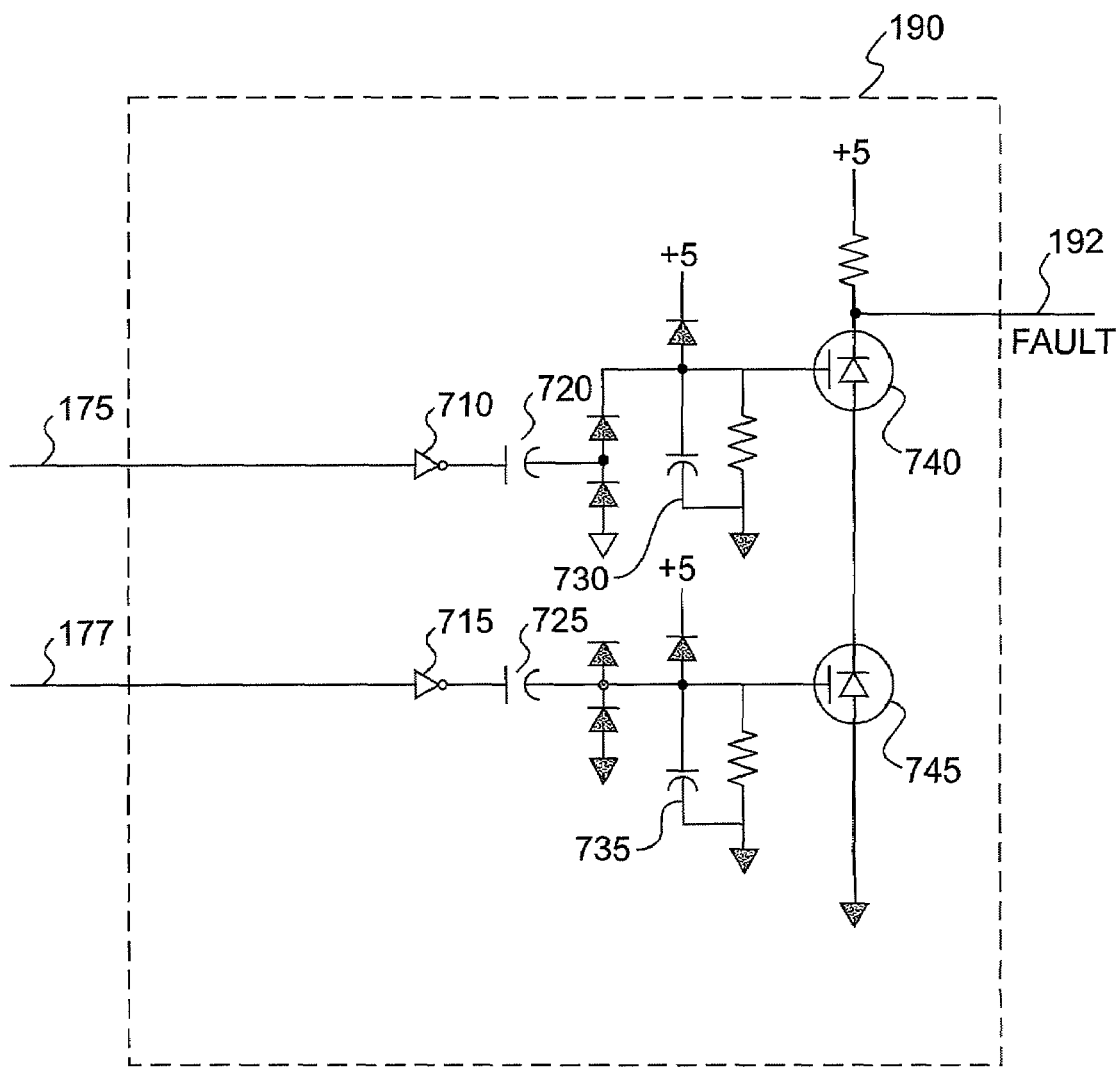
FIG. 7 illustrates a schematic diagram of a combinatorial fault circuit consistent with an embodiment of the present invention.

FIG. 7 illustrates a schematic diagram of the combinatorial fault circuit 190 consistent with an exemplary embodiment of the present invention. The combinatorial fault circuit 190 uses two charge capacitors 730 and 735 to keep MOSFETS 740 and 745 turned on as long as a pulse stream is present on both differential input lines. When these MOSFETS 740 and 745 are turned on, fault signal 192 remains low (false), but should either pulse stream become inactive, the associated MOSFET 740 and/or 745 will turn off, placing a high signal on the fault signal 192.

Data low pump 175 and data high pump 177 feed a signal into buffers 710 and 715, respectively. Buffers 710 and 715 act as a high impedance buffer so as to not load down transistors 550 and 555. Pump circuits 720 and 725 act to charge up charge capacitors 730 and 735 as long as data is coming in to data low pump 175 and data high pump 177. For instance, when the data signal is high at buffer 710, pump circuit 720 powers up the capacitor through the lower diode, and when the data signal is low at buffer 710, pump circuit 720 discharges through the upper diode to keep capacitor 730 charged up. Any overcharging is bled off to the supply voltage. Resistors 732 and 737 in parallel to the charge capacitors 730 and 735 provide enough of a time constant to not bleed off the charge capacitors 730 and 735 if there is a momentary blip in the input signal. If the signal is lost past the time delay of the time constant, the charge capacitors discharge thereby turning off MOSFETS 740 or 745. This provides a fault indication on fault signal 192.

Those skilled in the art will appreciate that while discrete components are illustrated in this exemplary embodiment, integrated circuit construction is also contemplated. Each component in this description, or an equivalent thereof, can be implemented in an integrated circuit, and such construction would be considered to be at least an equivalent of the above described circuitry. In addition, those skilled in the art will appreciate that transistor type, e.g., PNP/NPN, NFET, PFET or BJT can be substituted with appropriate changes in circuitry to achieve similar results. In addition, while discrete transistors are shown, differential amplifiers can also be constructed from operational amplifiers meeting the necessary speed requirements and propagation delay to function at CAN data speeds.

FIGS. 8a–8f illustrate a time domain graph of differential voltage signals during normal operation in the circuit of an exemplary embodiment of the present invention. FIGS. 9a–9f illustrate a time domain graph of differential voltage signals in the circuit during a fault of an exemplary embodiment of the present invention. These figures will be discussed more fully in the following Industrial Applicability portion of this specification.

INDUSTRIAL APPLICABILITY

Figure 8A:
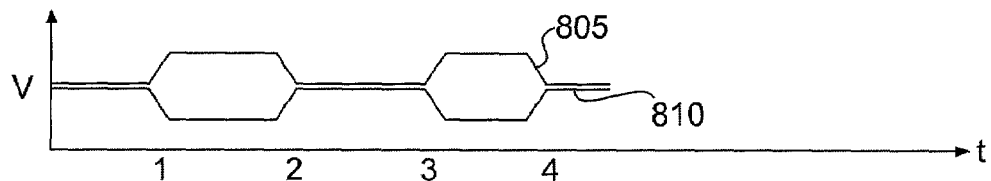
FIG. 8a illustrates a a graph of a typical differential input signal as input into an exemplary embodiment of the present invention.

FIG. 8a illustrates a typical differential input signal as input into an exemplary embodiment of the present invention. A CAN high input 805 is input at CAN high input 100. A CAN low input 810 is input at CAN low input 115. In a recessive state, prior to time t=1, between times t=2 and t=3, and after time t=4, the two inputs float at a similar voltage. At time t=1, a dominant state is placed on the bus and a differential voltage is placed across the inputs. This differential voltage remains until time t=2 when the differential voltage is removed and the two inputs return to a similar voltage.

Figure 8B:
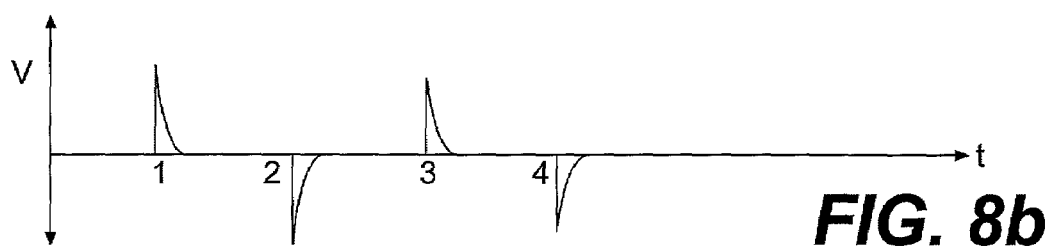
FIG. 8b illustrates a graph of a typical signal output from isolated CAN high in an exemplary embodiment of the present invention.
Figure 8C:
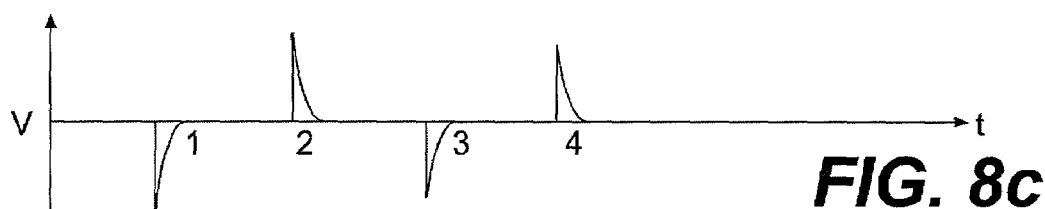
FIG. 8c illustrates a graph of a typical signal output from isolated CAN low in an exemplary embodiment of the present invention.

FIGS. 8b and 8c illustrate a graph of the output of the capacitive isolation circuit in an exemplary embodiment of the present invention. FIG. 8b illustrates a typical signal output from isolated CAN high 155, and FIG. 8c illustrates a typical signal output from isolated CAN low 170.

On the high side of the differential input, as the input signal 805 goes high at time t=1, the capacitive isolation circuit 152 removes the DC component from the signal and provides a positive pulse. At time t=2, the capacitive isolation circuit 152 provides a negative pulse. These pulses are provided on isolated CAN high 155 to the edge triggering circuit 172.

On the low side of the differential input, as the input signal 810 goes low at time t=1, the capacitive isolation circuit 152 removes the DC component from the signal and provides a negative pulse. At time t=2, the capacitive isolation circuit 152 provides a positive pulse. These pulses are provided on isolated CAN low 170 to the edge triggering circuit 172.

Figure 8D:
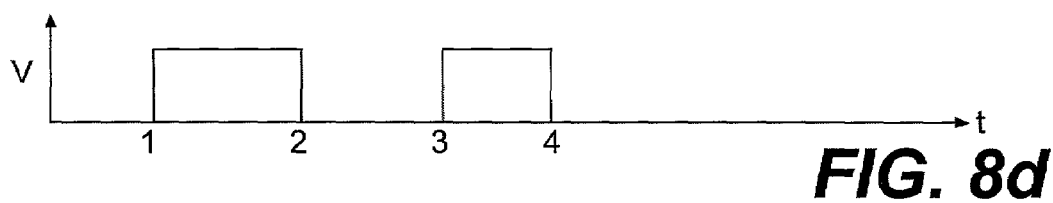
FIG. 8d illustrates a graph of the data high output of the edge triggering circuit in an exemplary embodiment of the present invention.
Figure 8E:
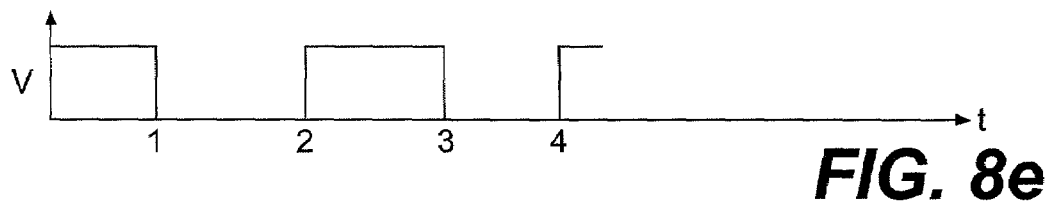
FIG. 8e illustrates a graph of the data low output of the edge triggering circuit in an exemplary embodiment of the present invention.

FIGS. 8d and 8e illustrate a graph of the output of the edge triggering circuit 172 in an exemplary embodiment of the present invention. Through operation of the differential amplifiers, transistors, and schmitt triggers, the edge triggering circuit 172 reconstructs a digital data signal from the incoming pulses. At time t=1, a positive pulse arrives on the high side, thus turning on the high side differential amplifier. A negative pulse also arrives on the low side, thus turning off the low side differential amplifier. At time t=2, opposite pulses arrive reversing the latching of the differential amplifiers.

Figure 8F:
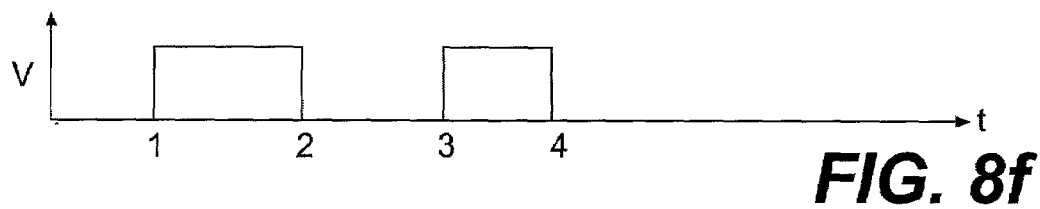
FIG. 8f illustrates a graph of the bitstream out of the combinatorial data circuit of an exemplary embodiment of the present invention.

FIG. 8f illustrates a graph of the bitstream out of the combinatorial data circuit 186 of an exemplary embodiment of the present invention. The combinatorial data circuit 186 reconverts the signal back into pulses and then compares the high data and low data stream to generate an output bitstream. The output bitstream in the graph is the same as the graph illustrated in FIG. 8d because both inputs are intact.

Figure 9A:
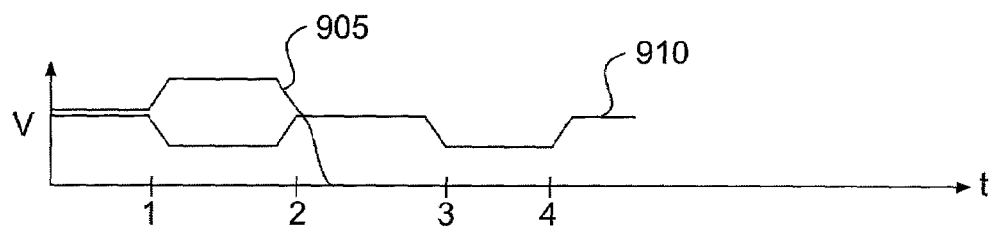
FIG. 9a illustrates a a graph of a faulty differential input signal as input into an exemplary embodiment of the present invention.

FIG. 9a illustrates a faulty differential input signal as input into an exemplary embodiment of the present invention. A CAN high input 905 would be input at CAN high input 100. A CAN low input 910 would be input at CAN low input 115. In a recessive state, prior to time t=1, the two inputs float at a similar voltage. At time t=1, a dominant state is placed on the bus and a differential voltage is placed across the inputs. This differential voltage remains until time t=2 when the differential voltage is removed and the two inputs should return to a similar voltage. However, the high side of the bus has grounded at approximately time t=2. Thus, only the low side of the differential input is functional after this point.

Figure 9B:
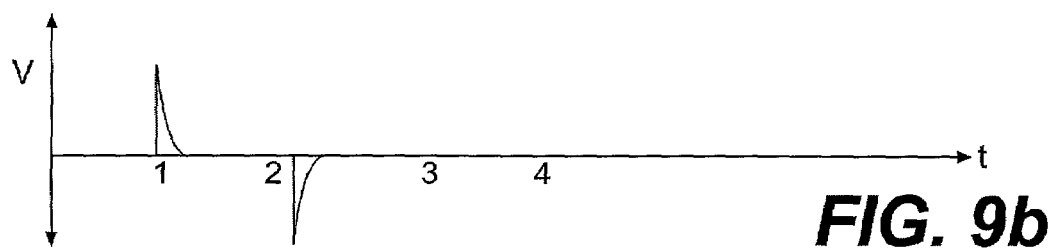
FIG. 9b illustrates a graph of a faulty signal output from isolated CAN high in an exemplary embodiment of the present invention.
Figure 9C:
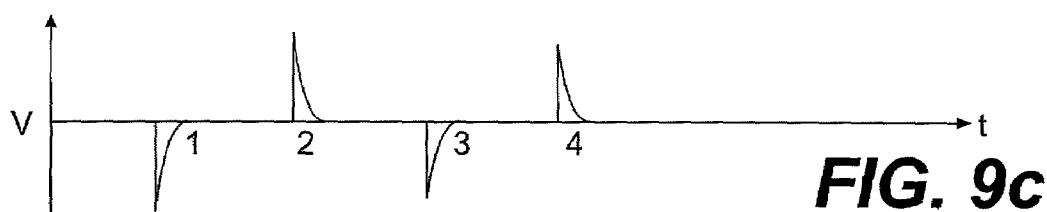
FIG. 9c illustrates a graph of a signal output from isolated CAN low in an exemplary embodiment of the present invention.

FIGS. 9b and 9c illustrate a graph of the output of the capacitive isolation circuit during a fault in an exemplary embodiment of the present invention. FIG. 9b illustrates a faulty signal output from isolated CAN high 155, and FIG. 9c illustrates a typical signal output from isolated CAN low 170.

On the high side of the differential input, as the input signal 905 goes high at time t=1, the capacitive isolation circuit 152 removes the DC component from the signal and provides a positive pulse. At time t=2, the capacitive isolation circuit 152 provides a negative pulse. These pulses are provided on isolated CAN high 155 to the edge triggering circuit 172. However, after time t=2, the high side of the input CAN is grounded, so no further pulses are generated.

On the low side of the differential input, as the input signal 910 goes low at time t=1, the capacitive isolation circuit 152 removes the DC component from the signal and provides a negative pulse. At time t=2, the capacitive isolation circuit 152 provides a positive pulse. These pulses are provided on isolated CAN low 170 to the edge triggering circuit 172.

Figure 9D:
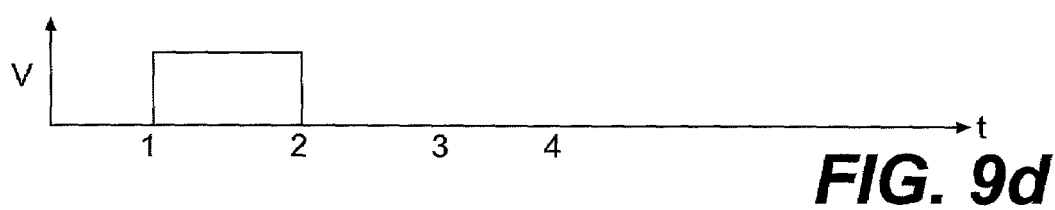
FIG. 9d illustrates a graph of the data high output of the edge triggering circuit during a fault in an exemplary embodiment of the present invention.
Figure 9E:
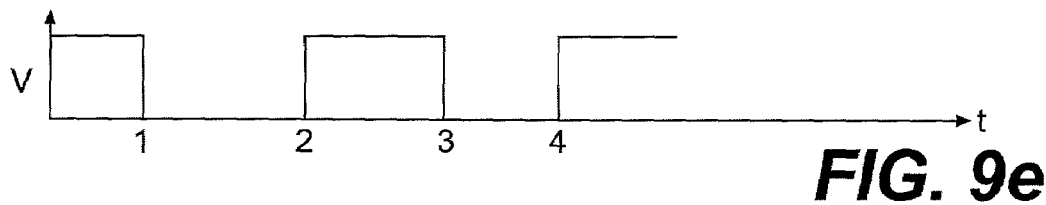
FIG. 9e illustrates a graph of the data low output of the edge triggering circuit during a fault in an exemplary embodiment of the present invention.

FIGS. 9d and 9e illustrate a graph of the output of the edge triggering circuit 172 during a fault in an exemplary embodiment of the present invention. Through operation of the differential amplifiers, transistors, and schmitt triggers, the edge triggering circuit 172 reconstructs a digital data signal from the incoming pulses. At time t=1, a positive pulse arrives on the high side, thus turning on the high side differential amplifier. A negative pulse also arrives on the low side, thus turning off the low side differential amplifier. At time t=2, opposite pulses arrive, thereby reversing the latching of the differential amplifiers. However, after time t=2, no further pulses are received by the high side differential amplifier, so the differential amplifier remains in the off state and no further data is output from the high side.

Figure 9F:
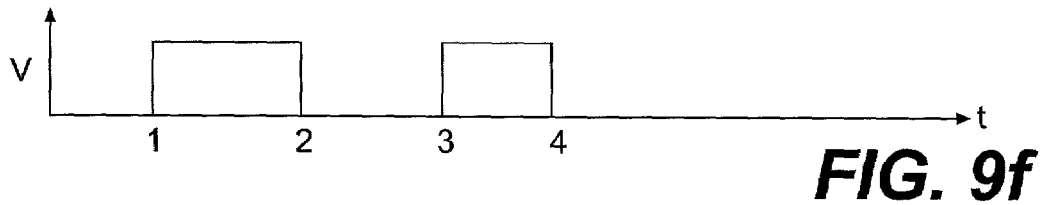
FIG. 9f illustrates a graph of the bitstream out of the combinatorial data circuit during a fault of an exemplary embodiment of the present invention.

FIG. 9f illustrates a graph of the bitstream out of the combinatorial data circuit 186 during a fault of an exemplary embodiment of the present invention. The combinatorial data circuit 186 reconverts the signal back into pulses and them compares the high data and low data stream to generate an output bitstream. The output bitstream in the graph turns on at time t=1 because the high side input is greater than the low side input. At time t=2, the output reverses as the high side input falls and the low side input rises. At time t=3, there are no pulses generated by the high side to the differential amplifier because of the loss of signal. However, pulses remain coming from the low side, thus continuing to latch the differential amplifier on and off as the low side input changes. Thus, a failure of one of the two differential inputs continues to drive the system successfully.

The disclosed system may act to interface an electronic device to a plurality of two-wire and four-wire network standards. This interface can be accomplished without manual reconfiguration. Because the interface is not specific to a single network, cost efficiencies can be obtained in implementing the system.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. An electronic interface for connecting to a network having a data stream placed on a bus high signal and a bus low signal, comprising:
    a ground synthesizer circuit, coupled to the bus high signal and bus low signal, configured to synthesize a ground from the bus high signal and bus low signal;
    a capacitive isolator circuit, coupled to the ground synthesizer circuit, configured to generate an isolated bus high signal from the bus high signal; and
    an edge triggering circuit, coupled to the capacitive isolator circuit, configured to regenerate the data stream into a first reconstructed data stream by comparing the isolated bus high signal with the ground.

2. The electronic interface of claim 1, wherein the ground synthesizer is further operable to utilize a ground input as a ground signal.

3. The electronic interface of claim 1, further comprising an input protection circuit coupled to receive inputs from the bus high signal and bus low signal and for transmitting protected signals to the ground synthesizer circuit.

4. The electronic interface of claim 3, wherein the input protection circuit is further operable to receive a power input and a ground input.

5. The electronic interface of claim 4, wherein the power input and ground input are connected through an impedance to limit the load on the power input.

6. The electronic interface of claim 1, wherein the capacitive isolator further comprises a capacitor and a resistor in series between the bus high signal and the isolated bus high signal.

7. The electronic interface of claim 1, wherein the edge triggering circuit further comprises a differential amplifier coupled with the capacitive isolator circuit to reconstruct the data stream by comparing the isolated bus high signal with the ground.

8. The electronic interface of claim 7, wherein the differential amplifier is also configured as a schmitt trigger for switching of the amplifier.

9. The electronic interface of claim 1, wherein the capacitive isolator circuit is further coupled with a bus low signal and a ground to receive a low data stream and operable to generate an isolated bus low signal from the bus low signal; and
    the edge triggering circuit is further operable to regenerate the data stream into a second reconstructed data stream by comparing the isolated bus low signal with the ground.

10. The electronic interface of claim 9, further including:
    a combinatorial data circuit coupled with the edge triggering circuit to receive the first reconstructed data stream and the second reconstructed data stream for generating an output bitstream from the first reconstructed data stream and the second reconstructed data stream.

11. The electronic interface of claim 10, wherein the combinatorial data circuit further comprises a differential amplifier coupled with the edge triggering circuit to receive the first reconstructed data stream and the second reconstructed data stream for comparing the first reconstructed data stream with the second reconstructed data stream and generating the output bitstream based on the comparison.

12. The electronic interface of claim 1, further comprising a combinatorial fault circuit coupled to the capacitive isolator circuit to receive a data high pump signal and operable to analyze the first reconstructed data stream and generating a fault if the first reconstructed data stream fails to transition as indicated by the data high pump signal.

13. The electronic interface of claim 12, wherein the combinatorial fault circuit further comprises a data pump coupled to the capacitive isolator circuit for receiving a data high pump signal, the data pump in series with a charging capacitor, the charging capacitor placed in series with a resistor and in parallel with the base of a transistor, such that when the charging capacitor discharges through the resistor the transistor turns off, triggering a fault signal.

14. A method of reconstructing an input data stream into an output data stream, comprising:
    capacitively isolating the input data stream to form a data stream of edge pulses;
    comparing the data stream of edge pulses to a ground signal; and
    latching the output data stream high upon a positive edge pulse and latching the output data stream low upon a negative edge pulse to create the output data stream.

15. The method of claim 14, further comprising:
    capacitively isolating a second input data stream to form a second data stream of edge pulses;
    comparing the second data stream of edge pulses to the ground signal;
    latching a second output data stream high upon a second data stream negative edge pulse and latching the second output data stream low upon a second data stream negative edge pulse; and
    comparing the output data stream and the second output data stream to form a third output data stream.

16. The method of claim 15, further comprising:
    generating the ground signal from a combination of the first input data stream and the second input data stream; and capacitively isolating the ground signal from the first input data stream and the second input data stream.

17. The method of claim 15, further comprising:
receiving the ground signal from an input ground signal.

18. The method of claim 17, further comprising:
receiving an input power signal; and
coupling the input power signal to the input ground signal through an impedance to prevent overloading a power source.

19. The method of claim 14, further comprising:
monitoring the output data stream for the presence of an active data stream; and
triggering a fault condition upon the absence of the active data stream.

20. An electronic interface for connecting to a network having a data stream placed on a bus high signal and a bus low signal, comprising:
a synthesizing means coupled to the bus high signal and the bus low signal for synthesizing a ground from the bus high signal and bus low signal;
an isolating means coupled to the synthesizing means for receiving the bus high signal from the synthesizing means and the ground from the synthesizing means and for generating an isolated bus high signal from the bus high signal; and
a reconstruction means coupled to the isolating means for receiving an isolated bus high signal and a ground and for reconstructing the data stream by comparing the isolated bus high signal with the ground.

21. An electronic interface for connecting to a network having a data stream placed on a bus high signal and a bus low signal, comprising:
a ground synthesizer circuit coupled to the bus high signal and the bus low signal and configured to create a synthesized ground from the bus high signal and bus low signal; and
a capacitive isolator circuit coupled to the ground synthesizer circuit and for receiving the bus high signal and the bus low signal and configured to generate an isolated bus high signal from the bus high signal, an isolated bus low signal from the bus low signal, and an isolated ground from the synthesized ground.

22. The electronic interface of claim 21, wherein the ground synthesizer circuit comprises:
a first resistor placed in series between the bus high signal and the synthesized ground; and
a second resistor placed in series between the bus low signal and the synthesized ground.

23. The electronic interface of claim 22, wherein the resistors provide substantially the same resistance.

24. The electronic interface of claim 21, wherein the capacitive isolator circuit comprises:
a first capacitor and a first resistor in series between the isolated bus high signal and the bus high signal;
a second capacitor and a second resistor in series between the isolated bus low signal and the bus low signal; and
a third capacitor and a third resistor in series between the isolated synthesized ground and the synthesized ground.

* * * * *